US008280433B2

(12) United States Patent
Quinn et al.

(10) Patent No.: US 8,280,433 B2
(45) Date of Patent: Oct. 2, 2012

(54) DATABASE FOR ANTENNA SYSTEM MATCHING FOR WIRELESS COMMUNICATIONS IN PORTABLE INFORMATION HANDLING SYSTEMS

(75) Inventors: Liam B. Quinn, Austin, TX (US); Alan E. Sicher, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 523 days.

(21) Appl. No.: 11/807,490

(22) Filed: May 29, 2007

(65) Prior Publication Data

US 2008/0300009 A1    Dec. 4, 2008

(51) Int. Cl.
*H04M 1/00* (2006.01)

(52) U.S. Cl. ............... 455/553.1; 370/332; 370/329; 370/334; 370/328; 370/522; 455/552.1; 455/525; 455/63.1; 455/67.13; 455/63.3

(58) Field of Classification Search ............ 455/552.1, 455/553.1, 426.1; 370/332, 329, 334, 328, 370/522
See application file for complete search history.

(56) References Cited

U.S. PATENT DOCUMENTS

| | | | |
|---|---|---|---|
| 5,677,698 A | 10/1997 | Snowdown | 343/770 |
| 6,307,525 B1 | 10/2001 | Bateman et al. | 343/853 |
| 6,509,877 B2 | 1/2003 | Masaki | 343/702 |
| 6,538,606 B2 | 3/2003 | Quinn et al. | 343/702 |
| 6,560,443 B1 | 5/2003 | Vaisanen et al. | 455/73 |
| 6,643,522 B1 * | 11/2003 | Young | 455/552.1 |
| 6,720,932 B1 | 4/2004 | Flynn et al. | 343/786 |
| 6,954,446 B2 | 10/2005 | Kuffner | 370/335 |
| 6,978,121 B1 | 12/2005 | Lane et al. | 455/73 |
| 7,034,771 B2 | 4/2006 | Rao et al. | 343/840 |
| 7,038,621 B2 | 5/2006 | Gabriel et al. | 342/372 |
| 7,046,201 B2 | 5/2006 | Okada | 343/700 |
| 7,117,013 B2 * | 10/2006 | Cromer et al. | 455/558 |
| 7,437,158 B2 * | 10/2008 | Russell | 455/435.2 |
| 7,450,523 B1 | 11/2008 | Robertson et al. | 370/252 |
| 7,606,553 B2 * | 10/2009 | Konaka | 455/403 |
| 2002/0085516 A1 | 7/2002 | Bridgelall | 370/329 |
| 2002/0094808 A1 * | 7/2002 | Tiedemann et al. | 455/419 |
| 2002/0120519 A1 | 8/2002 | Martin et al. | 705/21 |
| 2002/0137472 A1 | 9/2002 | Quinn et al. | 455/90 |
| 2004/0029619 A1 | 2/2004 | Liang et al. | 455/562.1 |
| 2004/0105411 A1 | 6/2004 | Boatwright et al. | 370/338 |

(Continued)

OTHER PUBLICATIONS

U.S. Appl. No. 11/639,158, "System and Method for Antenna Resource Management in Non-Harmonized RF Spectrum," filed Dec. 14, 2006.

(Continued)

*Primary Examiner* — Dwayne Bost
*Assistant Examiner* — Edward Zhang
(74) *Attorney, Agent, or Firm* — O'Keefe, Egan, Peterman & Enders, LLP

(57) ABSTRACT

Systems and method are disclosed for internal matching and configuration of radio frequency communication modules and antenna systems within a portable information handling system to help alleviate contentions among wireless communication technologies. A database stores operational information associated with wireless communication radio modules and antenna systems. A central control and switching module then matches and configures antenna systems and communication modules based upon stored operational information. The stored information can include device requirements, regional communication requirements, communication protocols and/or any other desired operational information. Flexibility is thereby provided for wireless communications, and worldwide intelligent access is allowed to radio frequency (RF) spectrums while adhering to localized spectrum and regulatory policies.

20 Claims, 5 Drawing Sheets

U.S. PATENT DOCUMENTS

| | | | |
|---|---|---|---|
| 2004/0142723 A1 | 7/2004 | Shippee | 455/552.1 |
| 2004/0160370 A1 | 8/2004 | Ghosh et al. | 343/702 |
| 2004/0204026 A1 | 10/2004 | Steer et al. | 455/550.1 |
| 2005/0093752 A1 | 5/2005 | Cheng et al. | 343/702 |
| 2005/0159164 A1 | 7/2005 | Leedom, Jr. | 455/450 |
| 2005/0165916 A1 | 7/2005 | Cromer et al. | 709/220 |
| 2005/0170776 A1 | 8/2005 | Siorpaes | 455/41.2 |
| 2005/0195777 A1 | 9/2005 | Green | 370/338 |
| 2005/0278371 A1 | 12/2005 | Funk et al. | 707/102 |
| 2006/0034221 A1 | 2/2006 | Karaoguz et al. | 370/330 |
| 2006/0229079 A1 | 10/2006 | Cheng et al. | 455/450 |
| 2006/0262747 A1 | 11/2006 | Posamentier | 370/329 |
| 2006/0281466 A1* | 12/2006 | Gholmieh et al. | 455/450 |
| 2007/0025464 A1 | 2/2007 | Perlman | 375/267 |
| 2007/0053410 A1 | 3/2007 | Mahonen et al. | 375/130 |
| 2007/0155421 A1* | 7/2007 | Alberth et al. | 455/553.1 |
| 2008/0016060 A1 | 1/2008 | Hall | 707/6 |
| 2008/0146269 A1 | 6/2008 | Pirzada et al. | 455/552.1 |
| 2008/0293447 A1* | 11/2008 | Rofougaran | 455/553.1 |
| 2009/0186575 A1* | 7/2009 | Cedo Perpinya et al. | 455/41.2 |

OTHER PUBLICATIONS

FVC-1 Voltage Coupler: DX Engineering (2007).

VCC-USB2.0-T$^V$ Video Capture Box (2007).

M2100 High Speed Bit Mux; DRS Technologies (2007).

U.S. Appl. No. 11/639,158, "Office Action Mailed May 9, 2011," filed Dec. 12, 2006.

U.S. Appl. No. 11/639,158, "Office Action Mailed Aug. 2, 2011," filed Dec. 14, 2006.

U.S. Appl. No. 11/639,158, "*Advisory Action Before the Filing of an Appeal Brief,*" dated Aug. 24, 2011, filed Dec. 14, 2006.

U.S. Appl. No. 11/639,158, "*Request for Continued Examination (Rce) Transmittal and Amendment,*" dated Aug. 29, 2011, filed Dec. 14, 2006.

U.S. Appl. No. 11/639,158, "Office Action Mailed Apr. 27, 2012," filed Dec. 14, 2006.

Mitolla III, Joseph, "*Cognitive Radio; An Integrated Agent Architecture for Software Defined Radio,*" Dissertation, Doctor of Technology, Royal Institute of Technology (KTH), Sweden, May 8, 2000.

* cited by examiner

DATABASE FOR ANTENNA SYSTEM MATCHING FOR WIRELESS COMMUNICATIONS IN PORTABLE INFORMATION HANDLING SYSTEMS

TECHNICAL FIELD OF THE INVENTION

This invention relates to systems and methods for portable information handling systems having a plurality of different radio frequency communication modules and related antenna systems configured to handle different communication protocols and networks.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

New converged mobile usage models and applications continue to emerge, enabled by integrated wireless technologies operating over a wide range of radio frequency bands. Local, regional and public policy regulations, however, often exist that determine whether frequency bands can be used and, if so, the manner in which they can be used. These regional spectrum and regulatory requirements and their differences make it difficult to manufacture a portable information handling system that will adequately meet these regional regulatory requirements. In addition, the proliferation of wireless technologies complicates this further and makes it even more difficult to provide the end user with all available choices. Examples of existing and new wireless technologies include those related to the following protocols and standards:

- 3G/4G mobile broadband (cellular mobile phone networks)
- Wi-Fi/WLAN (with MIMO support)
- Bluetooth
- Ultra Wideband (UWB)
- Very High Speed UWB (60 GHz)
- RFID
- Near Field Communications (NFC)
- GPS
- WiMax (802.16)
- 802.20 (Flash OFDM)
- DVB-H/FLO/DMB-T (mobile TV)
- Real-time Multimedia Services
- Broadband Wireless Access ('White Space Spectrum')

One solution to this problem of increased wireless technologies and increase regionalization of regulations for these technologies is to keep adding wireless devices, bus interface ports and slots to portable systems and antennas to cover the feature requirements. However, continuing to add integrated wireless devices into mobile computing platforms is not scalable and leads to many problems, including design challenges, unit cost, system complexity and system form factor requirements. For example, design problems caused by increases in the number of wireless devices and slots within a portable information handling system include mechanical form-fit-function problems, electrical connection problems, input/output (I/O) interface problems, thermal problems, EMI issues, antenna structure problems, interference antenna coupling issues, regulatory problems, device identification problems, manufacturing and inventory complexities, and other design problems. Unfortunately, therefore, as electrical I/O bus interfaces and technology-specific antenna structures are incrementally added to cover new technologies to satisfy user demand and usage models, the cost and size of portable systems rapidly increase. The increase in size and complexity drive larger platform form factor sizes, more complex mechanical interconnections, system and hardware identification (ID) problems, and other cost related issues.

In addition, for BTO (build to order) configurations, where customers are selecting configurations, the design problems are further aggravated unless significant limitations are placed upon user selectable options. As such, one solution is to limit technologies and slots within portable information handling systems. In particular, to address the mismatch between a plurality of relevant customer wireless technology options and a limited number of wireless slots within the system, specific technology combinations can be restricted. However, this solution forces contention between multiple electrical I/O bus slots (device/technology) and results in reduced flexibility in addressing potentially relevant technology choices and customer usage requirements.

Although attempts can be made to combine wireless technologies on the same radio card or module, such combinations are often not feasible. Combining or integrating multiple technologies on a single radio cards or integrated circuits often does not work due to technology differences and often will not apply across the wireless technology landscape due to fundamental differences in customer adoption, business models and evolution paths, and silicon technology roadmap complexities. Even when feasible, contentions would still exist within the portable information handling system for slots and antennas.

SUMMARY OF THE INVENTION

Systems and method are disclosed for internal matching and configuration of radio frequency communication modules and antenna systems within a portable information handling system to help alleviate contentions among wireless communication technologies. A database stores operational information associated with the communication systems and modules within the portable information handling system. The portable information handling system includes a plurality of different wireless radio modules configured to handle different communication technologies and protocols. The portable information handling system also includes one or more antenna systems of different classes or types for transmitting or receiving radio frequency signals associated with the communication protocols. A central control and switching module then allocates and configures an antenna system for radio modules, when active, based upon the operational information stored in the database. This information can include device requirements, regional communication requirements, communication protocols and/or any other desired operational information. Flexibility is thereby provided for wireless communications, and worldwide intelligent access is enabled to operate across a wide range of radio frequency (RF) spectrum bands while adhering to localized spectrum and regulatory policies. As described below, other features and variations can be implemented, if desired, and related systems and methods can be utilized, as well.

DESCRIPTION OF THE DRAWINGS

It is noted that the appended drawings illustrate only exemplary embodiments of the techniques described herein and are, therefore, not to be considered limiting of its scope, for the invention may admit to other equally effective embodiments.

DETAILED DESCRIPTION OF THE INVENTION

Figure 1:
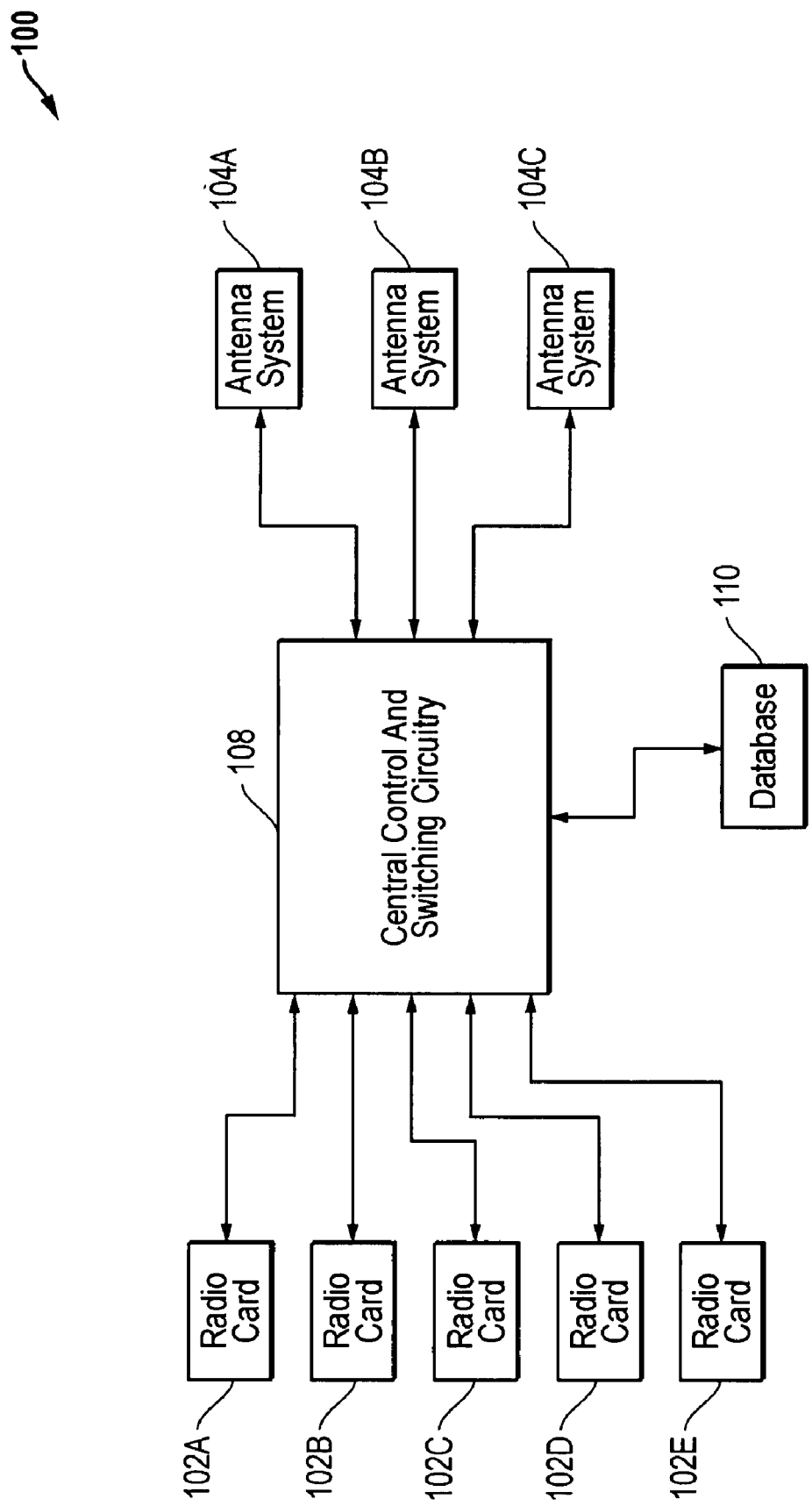
FIG. 1 is a block diagram of a system for matching antenna systems with radio systems within a portable information handling system.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more electrical I/O interfaces or buses operable to transmit communications between the various hardware components.

Flexibility in handling wireless communication capabilities within information handling systems is desirable in that different systems may need different communication capabilities. Examples for providing flexibility in wireless communication capabilities are discussed, for example, in U.S. Pat. No. 6,538,606 and U.S. patent application Ser. No. 11/639,158 which was filed Dec. 14, 2006 and is entitled "SYSTEM AND METHOD FOR ANTENNA RESOURCE MANAGEMENT IN NON-HARMONIZED RF SPECTRUM" by Fahd B. Pirzada and Liam B. Quinn, each of which is hereby incorporated by reference in its entirety.

Antenna management and control systems and methods are disclosed herein that allow further flexibility for wireless communication capabilities. In particular, systems and methods are disclosed that allow portable information handling systems to match internal antenna systems to radio card modules and that allow worldwide intelligent access to radio frequency (RF) spectrums while adhering to localized spectrum and regulatory policies. An internal system database is used to store information relating to the operation of radio card modules, the operation of antenna systems, localized operational requirements and other desired operational details. A central control and switching module within the system then utilizes the database to match radio cards with antenna systems and to control the proper operation of the wireless communication systems based upon operational parameters for local requirements. In particular, antenna systems can be configured so that they meet local requirements for transmitting RF signals. Thus, the techniques described herein provide systems and methods for antenna resource management in a non-harmonized RF (radio frequency) spectrum.

FIG. 1 is a block diagram of a system 100 for matching antenna systems with radio cards within a portable information handling system. As depicted, radio cards 102A, 102B, 102C, 102D and 102E are different radio frequency (RF) communication modules configured to handle different communication protocols. Radio cards 102A, 102B, 102C, 102D and 102E are coupled to a central control and switching (CCS) circuitry 108, which is turn coupled to antenna systems 104A, 104B and 104C. A database module 110 stores operation information about the radio cards, the antenna systems, and operational parameters associated with each. CCS circuitry 108 is coupled to a database 110 and utilizes the information stored in the database 110 to configure the radio cards and the antenna systems for desired operation. For example, each radio module and each antenna system can be configured for one or more communication profiles based upon parameters such as transmit (TX) and/or receive (RX) power, frequency bands, channel frequencies, or other operational parameters. The CCS circuitry 108 can be configured to match radio cards with antenna systems depending upon desired operations. It is noted that the circuitry and modules described herein can be implemented as hardware, as software and/or as combinations thereof. For example, a software programmable microcontroller and an active analog switch (e.g., between the RF inputs and RF outputs) can be used to provide some or all of the central control and switching functionality.

If desired, the different antenna systems 104A, 104B and 104C and radio modules 102A, 102B, 102C, 102D and 102E can be identified using unique identification (ID) numbers. The database module 110 can be implemented as a look-up table (LUT), or other database structure, and can be configured to store information with respect to these ID numbers. The information can include any desired operational parameters. For example, the database 110 can be configured to store device specific parameters including parameters such as:

Frequency bands
channelization information
device gain parameters
pattern/polarization parameters
total radiated power requirements and limitations adjacent band rejection requirements and limitations
supported technologies;
beam steering capabilities; and
other desired settings or parameters.

As described above, the CCS circuitry 108 uses the database 110 parameters to configure and control the radio modules and antenna systems for required operation in compliance with localized RF spectrum, regulatory and public policy requirements.

The CCS circuitry 108 can optionally use operational techniques, such as linear programming, to optimize the antenna-radio card configuration. It is noted further noted that linear and/or integer optimization programming techniques can be used to match the radios and antenna systems. The antenna systems can also be configured and/or reconfigured for different transmission styles and reception styles depending upon operational requirements. For example, antenna systems can also be configured, if desired, such that they can be tuned to desired frequencies and/or frequency spectrums, and antenna systems can be capable of directional reception and transmission through electrical and/or mechanical beam steering. Other modifications to the antenna systems could be made, as desired, based upon the operational parameters stored in the database 110 and the operational environment in which the portable information handling system is operating.

Figure 2:
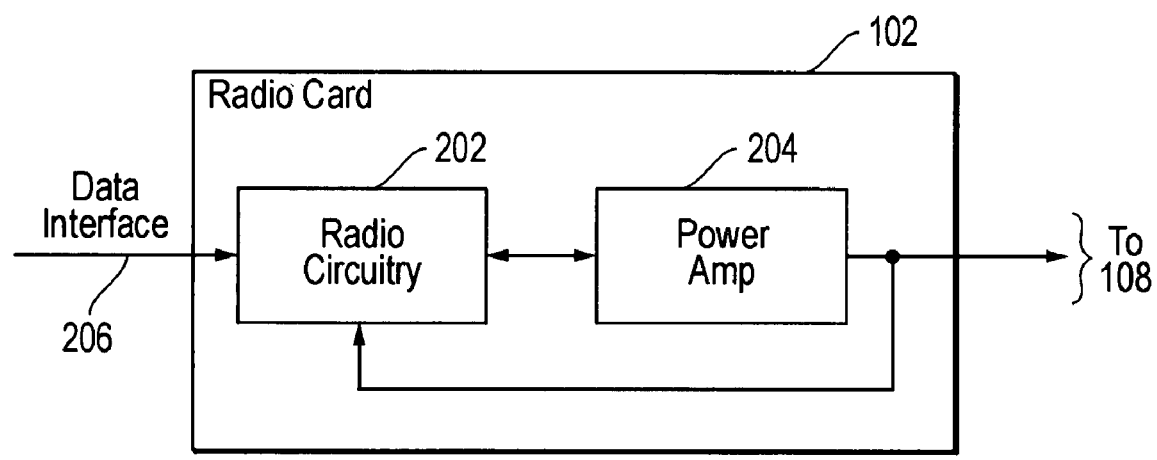
FIG. 2 is a block diagram of a radio card having radio circuitry and power amplifier circuitry.

FIG. 2 is a block diagram of an example embodiment for radio card 102. As depicted, the radio card 102 has radio circuitry 202, power amp 204 and an input/output (I/O) interface coupled to CCS circuitry 108. The radio circuitry 202 receives input signals from the CCS circuitry 108 for receive operations. The radio circuitry 202 also connects to power amplifier 204 within the radio card 102. The power amplifier 204 provides output signals to the CCS circuitry 108 for transmit operations. It is also noted that radio card circuitry 202 could also have a separate data interface 206 through which internal circuitry and operational blocks within the portable information handling system communicates internal data to and from the radio card 102.

Figure 3:
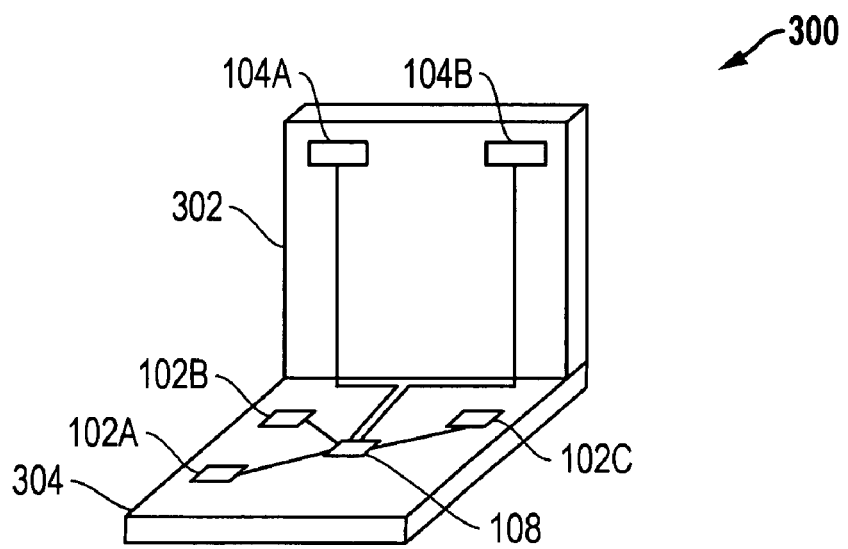
FIG. 3 is an example embodiment for a portable computer system having multiple radio cards and multiple antenna systems matched by a central control and switching system.

FIG. 3 is an example embodiment 300 for a portable computer system having multiple radio cards and multiple antenna systems controlled through a central control and switching system. As depicted, portable laptop computer system 300 includes a bottom portion 304 and a display portion 302 rotatably coupled to the bottom portion 304. The radio cards 102A, 102B and 102C connect to central control and switching (CCS) circuitry 108 within the bottom portion 304 of portable computer system 300. The CCS circuitry 108 also connects to antennas 104A and 104B that are positioned within the display portion 302 of a chassis for the portable laptop computer 300. The CCS circuitry 108 can be used to determine which radio cards 102A, 102B and 102C are active at any given time and can be used to an allocate antenna 104A or 104B to the radio cards 102A, 102B and 102C when active. In the embodiment of FIG. 3, the radio cards 102A, 102B and 102C are assumed to both transmit and receive RF signals and are assumed to have both radio circuitry and power amplifier circuitry on the same card as shown in the example embodiment of FIG. 2. Several methods may be used to dynamically tune and adapt the radio card modules and the antenna systems, including antenna array switching, active in-line tuning, filtering circuits, mechanically based array reconfiguration, electrical and/or mechanical beam forming, and/or any other desired antenna configuration. Auto configuration of radio cards and antenna systems may also be conducted using the information stored in the database 110.

It is noted that the portable information handling system more generally can include a chassis having a display that may or may not be rotatably coupled to the base portion. For example, tablet or slate portable computers may have a display that is coupled within a chassis in a non-rotatable manner. Thus, a wide variety of portable information handling systems may take advantage of the wireless communication embodiments disclosed herein, and FIG. 3 should not be considered as limiting on possible configurations for the portable information handling system 300.

Figure 4:
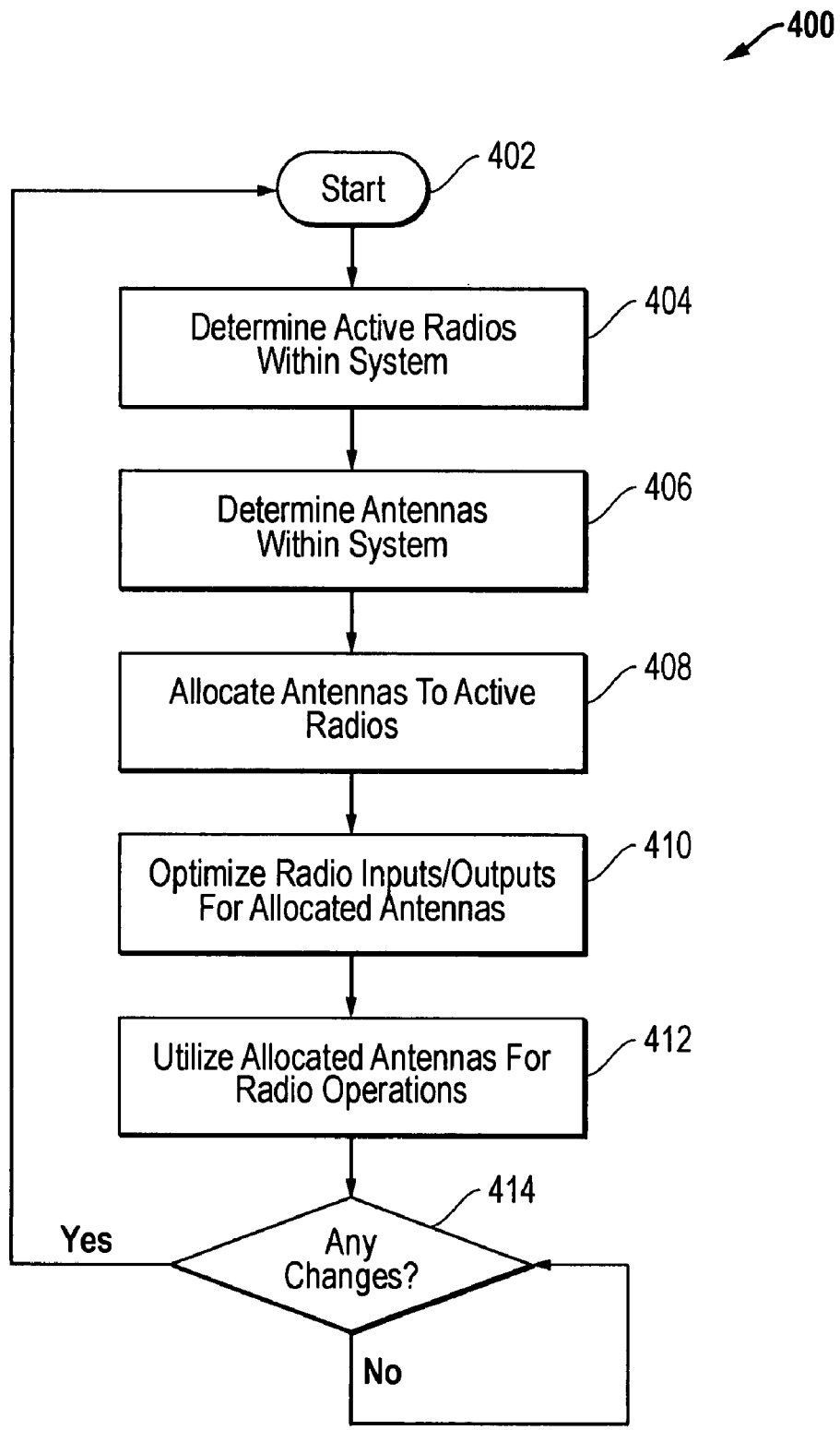
FIG. 4 is a flowchart for matching radio cards to antenna systems within a portable information handling system.

FIG. 4 is a flowchart 400 for matching radio cards to antenna systems within a portable information handling system. The process starts in block (START) 402. In block 404, a determination is made concerning the active radios within a system. In block 406, available antennas within the system are determined 406. In block 408, the CCS circuitry allocates an antenna to an active radio. In block 410, the radio inputs/outputs are optimized for the allocated antennas. For example, the CCS circuitry can obtain operational information from a database of parameters that are stored with respect to device ID numbers for the radio cards and antenna systems. The CCS circuitry can then configure the radio cards and antenna systems accordingly such that they will operate properly with respect to specific local and regional technologies, protocols and regulations. Specific antenna selection, tuning and alignment of the radio cards can be based upon this database information. Next, in block 412, the allocated antennas are used for radio operations with respect to the active radio card. The process then reaches decision bock 414 where a determination is made whether any changes have occurred with respect to the system. These changes could be, for example, changes in communication needs, addition of new radio cards, removal of radio cards, changes in geographic location, changes in available wireless networks, wireless protocol changes, and/or any other change that effects the wireless communications of the system. If the answer is "NO," then flow loops back to 414. If the answer is "YES," then flow proceeds back to start block (START) 402.

Figure 5:
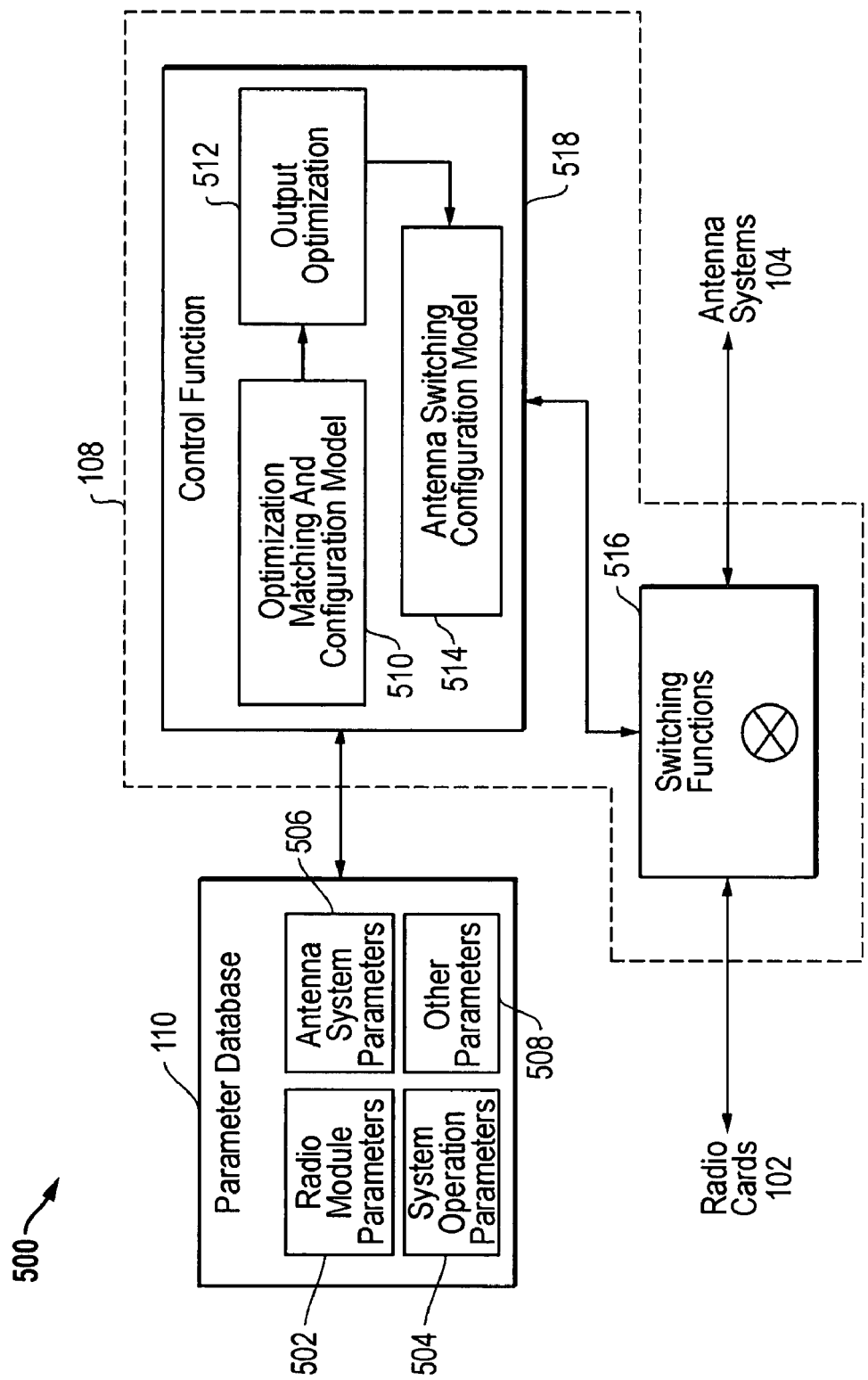
FIG. 5. is a block diagram of the control function and switch function within a portable information handling system.

FIG. 5 is a block diagram of an embodiment 500 for the control function 528 and switch function 526 within the a portable information handling system. Parameter database 110 stores configuration and operational data related to the communication systems and modules included as part of the portable information handling system. As depicted, parameter database 110 stores data for radio module parameters 502 related to a plurality of radio modules, system operation parameters 504 related to a plurality of system operational features, antenna system parameters 506 related to a plurality of antenna systems, and other parameters 508 related to any other desired wireless communications operational feature. The parameter database 110 is coupled to the CCS circuitry 108.

As depicted, the CCS circuitry 108 includes a control function block 518 and a switching function block 516. The control function block 518 includes an optimization matching and configuration model 510 for configuring radio and antenna blocks and matching their operations, an output optimization block 512 for optimizing the wireless output signals, and an antenna switching configuration model 514 for control the antenna input/output operations. The control function block communicates with the switching control block 516. The switching control block 516 provides a switching interface between the plurality of radio cards 102 and the plurality of antenna systems 104. The switching control block 516 can be implemented, for example, using one or more analog RF switches to provide analog RF communications between the plurality of radio cards 102 and the plurality of antenna systems 104.

In operation, the CCS circuitry 108 uses information stored in database 110 with respect to the different operational blocks to help control and configure the system for external wireless communications. As shown, the radio modules/cards 102 connect to the control and switching logic block 108, and the antenna structures/systems 104 also connect to the control and switching block 108. The control and switching logic block 108 is then controlled at least in part by the parameters stored in parameter database or look-up-table (LUT) 110 (e.g., located in a software driver or in system memory storage). The control and switching logic block 108 takes input from the LUT and uses these parameters to match the right radio module with the right antenna structure and to control the receive/transmit power limits for that application or region of operation (e.g., based on the policies of the country, region, etc.). Thus, control signals (not shown) from the CCS circuitry 108 to the modules within system 500 can be used to configure and control the operations of these various modules. Each of the radio cards 102 and antenna systems 104 can be configured for operation in a desired frequency band, using desired communication protocols, and according to regional or local communication standards and regulatory requirements. As described above, the database 110 can be configured to store device specific parameters including parameters such as: frequency bands, channelization information, device gain parameters, pattern/polarization parameters, total radiated power requirements and limitations, adjacent band rejection requirements and limitations, supported technologies, beam steering capabilities, and other desired settings or parameters. In short, the CCS circuitry 108 and database 110 provide significant flexibility in managing and configuring wireless communications with a portable information handling system and reduce costs by allowing blocks to be shared.

Figure 6:
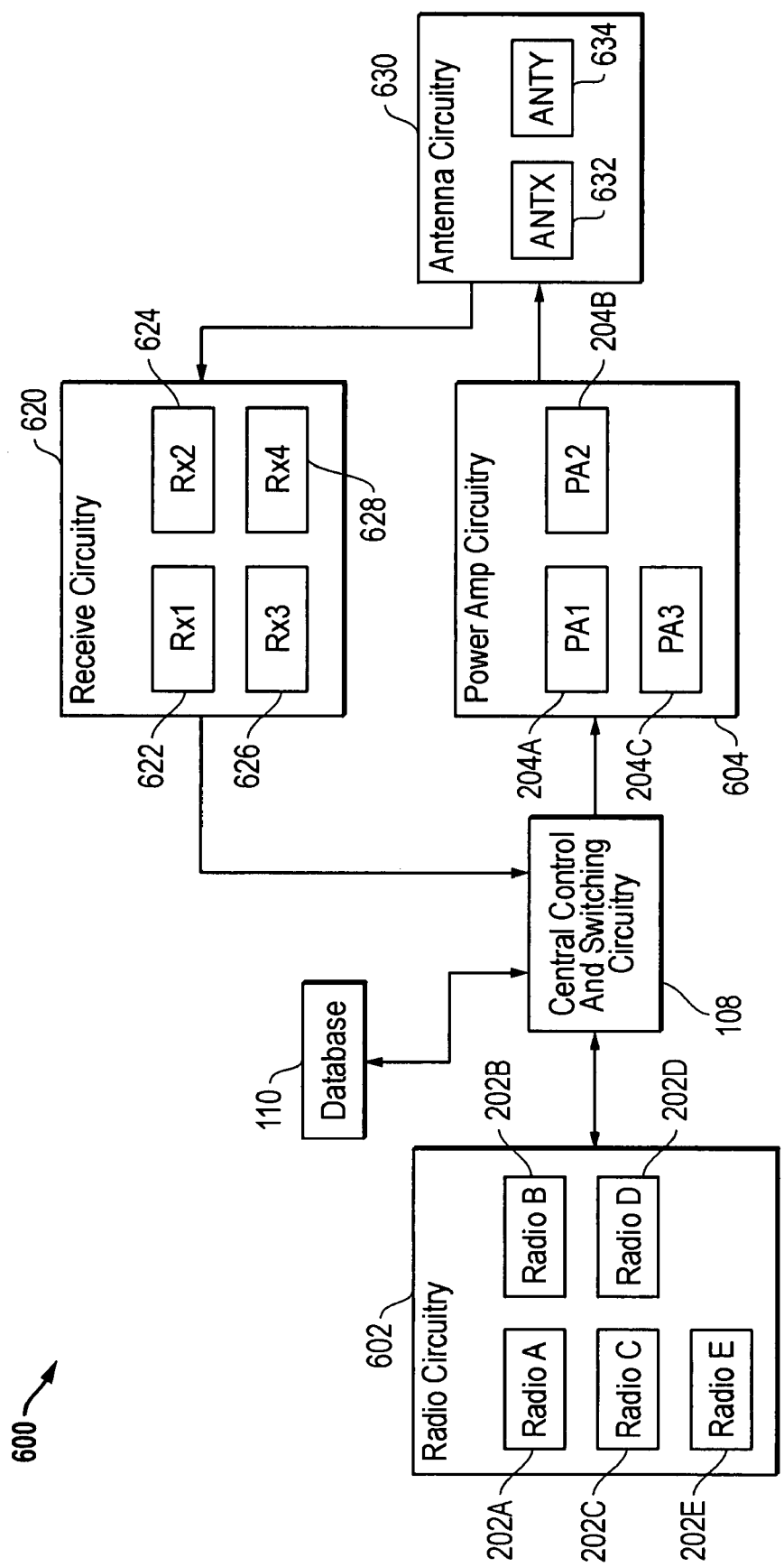
FIG. 6 is a block diagram of an alternative embodiment for matching antenna systems with radio systems within a portable information handling system where power amplifier circuitry is separated from the radio circuitry.

FIG. 6 is a block diagram for an alternative embodiment 600 for matching antenna systems with radio systems within a portable information handling system where functional blocks within the radio modules are separated to improve flexibility. As noted above, the radio cards or radio modules can be configured in different ways, as desired. As depicted in FIG. 6, one alternative embodiment is to have the radio circuitry that processes the RF signals based upon particular technologies separated from the power amplifiers (PAs) that are used to transmit the RF signals. In addition, analog receive circuitry can also be separated from the radio processing circuitry so that the radio processing circuitry can be entirely digital processing. This separation allows for further costs savings by potentially requiring fewer PAs, fewer analog front-end circuits and fewer antenna systems for the same number radio modules, depending upon how many need to be active at one time. The CCS circuitry 108 can then be configured with switching and control circuitry that allows for interconnection of the proper modules for operations within desired communication technologies.

As depicted, CCS circuitry 108 is coupled to and interfaces among radio modules within radio circuitry block 602, receiver circuitry modules within receiver circuitry block 620, power amplifier circuitry modules within power amplifier circuitry block 604, and antenna systems within antenna circuitry block 630. The radio circuitry block 602 includes five different radio modules 202A (Radio A), 202B (Radio B), 202C (Radio C), 202D (Radio D) and 202E (Radio E). The receive circuitry block 620 includes four front end receive circuitry blocks 622 (RX 1), 624 (RX 2), 626 (RX 3) and 628 (RX 4). The power amplifier circuitry block 604 includes three different power amplifier blocks 204A (PA1), 204B (PA2) and 204C (PA3). And the antenna circuitry block 630 includes two different antenna systems 632 (ANT X) and 634 (ANT Y). It is noted that the numbers of different modules and systems have been described for example purposes only, and other numbers and combinations could be used, as desired, depending upon the operational objectives desired to be achieved for particular applications. It is also again noted that the circuitry and different modules described herein could be implemented as hardware, as software, or as combinations thereof. In addition, a programmable microcontroller could be used to provide some or all of the functionality described herein, including the operations of the CCS circuitry 108 and the database 110. It is further noted that unlike the embodiment of FIG. 5 where the switching control function 516 would likely be implemented as analog RF switching, the CCS circuitry 108 in FIG. 6 could provide digital switching communications between the radio modules within the radio circuitry block 602 and the power amplifier blocks within the power amplifier circuitry block 614, for example, wherein digital-to-analog converters were included with respect to the power amplifier blocks 204A (PA1), 204B (PA2) and 204C (PA3).

In operation, the CCS circuitry 108 uses information stored in database 110 with respect to the different operational blocks and their use in different regional environments to help control and configure the system for external wireless communications. Control signals (not shown) from the CCS circuitry 108 to the modules within system 600 can be used to configure and control the operations of these various modules. For example, radio circuitry module 202A (Radio A) can be matched with power amplifier circuitry 204C (PA3) and antenna circuitry system 634 (ANT Y) for transmit operations and with receive circuitry block 624 (RX 2) for receiver operations. In addition, each of the circuit blocks and modules can be configured for operation in a desired frequency band, using desired communication protocols, and according to regional or local communication standards and requirements. For additional wireless communications, other combinations could similarly be made. For example, radio circuitry module 202C (Radio C) could be matched with power amplifier circuitry 204A (PA1) and antenna circuitry system 632 (ANT X) for transmit operations and with receive circuitry block 628 (RX 4) for receiver operations. As before, each of the circuit blocks and modules can be configured for desired operations. Still further, if two or more of the radio card modules are not active at the same time, circuit blocks and modules could be shared. In short, the CCS circuitry 108 and database 110 provide significant flexibility in managing and configuring wireless communications with a portable information handling system and reduce costs by allowing blocks to be shared.

In addition to allow operational sharing, the CCS circuitry 108 and database 110 also allow manufacturing advantages. For example, an antenna module could be provided that can be configured to operate with multiple different radio cards for multiple different communication systems. In addition, other blocks and modules could be provided that can be configured for operation in multiple different communication systems. As such, only the radio card and the operational information stored in the database 108 would need to change to support different communication systems and related protocols.

Information can be loaded and stored in the database 110 using a variety of techniques, as desired. For example, the information could be provided in the form of data stored in a memory device that is coupled to the CCS circuitry 108. The memory device could be read-only memory or programmable memory, as desired. The information could be loaded during manufacture of the portable information handling system. The information could also be loaded or modified at some later date depending upon the operational environment selected for the portable information handling system. For example, information could be provided to the database 110 through remote downloads, for example, through product or configuration updates. In addition, updated or modified information could be pushed down to the database 110 to address new technologies/radio cards, regulatory changes, roaming scenarios or any other desired configuration or operational changes. This product updating may be instigated by the portable computer itself, through client software, and/or through a product support system, which could be automated through software control on the system. In addition, an IT (information technology) administrator at a company or entity, an individual end user, or any other desired mechanism could be used to initiate a download of original, new or updated operation parameters to the database 110. In short, the database 110 can be implemented and managed using any of a wide variety of techniques to provide the control and configuration information desired for operation of the wireless communication capabilities within the portable information handling system.

For security reasons, the system could be configured to include access codes or other features to allow permanent or semi-permanent lock-down of information stored in the database. These security features would keep inadvertent or malicious changes from being made by an end user or other person through tampering or modification of the information within the database 110. These security features may include an administrator level BIOS (basic input output system) lock, registry settings, or other administrator settings within the system that require user authentication and passwords before providing access to the database 110. These security features could be used, for example, to keep users from reconfiguring wireless communication capabilities in such a way that they would violate operational requirements, such as allowed transmission power and allowed interference in adjacent channels or frequency bands. In addition, user logs can be kept for antenna system changes and usage for diagnostic and root cause analysis purposes.

Further modifications and alternative embodiments of the techniques described herein will be apparent to those skilled in the art in view of this description. It will be recognized, therefore, that the techniques described herein are not limited by these example arrangements. Accordingly, this description is to be construed as illustrative only and is for the purpose of teaching those skilled in the art the manner of carrying out the techniques described herein. It is to be understood that the forms of the techniques described herein shown and described are to be taken as the presently preferred embodiments. Various changes may be made in the implementations and architectures. For example, equivalent elements may be substituted for those illustrated and described herein and certain features of the techniques described herein may be utilized independently of the use of other features, all as would be apparent to one skilled in the art after having the benefit of this description of the techniques.

What is claimed is:

1. A portable information handling system having configurable wireless communication systems, comprising:
a chassis having a display;
a plurality of different wireless communication modules coupled within the chassis, each wireless communications module being configured to process a different communication protocol, each of the plurality of different wireless communication modules having an identification number;
a plurality of antenna modules coupled within the chassis, each antenna module being configured to transmit and/or receive radio frequency signals associated with one or more of the communication protocols, each of the plurality of antenna modules having an identification number;
a database configured to use the identification numbers to store operational information associated with each wireless communication module and each antenna module; and
control and switching module coupled to the plurality of different wireless communication modules, the plurality of antenna modules and the database, the control and switching module being configured to allocate at least one antenna module for use by each communication module when active, to utilize the identification numbers for the wireless communication modules and the antenna modules to obtain operational information from the database associated with the wireless communication modules and the antenna modules, and to modify communication parameters for the wireless communication modules and the antenna modules based upon the operational information obtained from the database.

2. The portable information handling system of claim 1, wherein the plurality of antenna modules are fewer in number than the plurality of communication modules.

3. The portable information handling system of claim 1, wherein the database comprises a memory device configured to store the operational information.

4. The portable information handling system of claim 3, wherein the memory device comprises a programmable memory device.

5. The portable information handling system of claim 4, wherein the programmable memory device is configured to be programmed by external signals.

6. The portable information handling system of claim 1, wherein the operational information comprises regional regulatory requirements related to one or more of the communication protocols.

7. The portable information handling system of claim 1, wherein the database is configured to be accessed only through one or more security features.

8. The portable information handling system of claim 7, wherein the security feature is a BIOS setting.

9. The portable information handling system of claim 1, wherein the wireless communication modules each comprises radio circuitry and power amplifier circuitry configured together on a single card.

10. The portable information handling system of claim 1, wherein the wireless communication modules each comprises radio circuitry configured for a different communication protocol, and further comprising a plurality of receive circuitry modules and a plurality of power amplifier modules, the control and switching module being configured to allocate and configure one of the communication modules, one of the receive circuitry modules, one of the power amplifier modules and one of the antenna modules for wireless communications in one of the communication protocols.

11. The portable information handling system of claim 1, wherein the chassis comprises a bottom portion and a display portion rotatably coupled to the bottom portion, the plurality of different wireless communication modules being located within the bottom portion and the plurality of antenna modules being located in the display portion.

12. A wireless communication system for an information handling system, comprising:
- a plurality of different wireless communication modules each being configured to process a different communication protocol, each of the plurality of different wireless communication modules having an identification number;
- a plurality of antenna modules for transmitting or receiving radio frequency signals associated with one or more of the communication protocols, each of the plurality of antenna modules having an identification number;
- a database configured to use the identification numbers to store operational information associated with each wireless communication module and each antenna module; and
- control and switching module configured to determine active wireless communication modules, to allocate at least one antenna module for use by each active communication module, to utilize the identification numbers for the wireless communication modules and the antenna modules to obtain operational information from the database associated with the wireless communication modules and the antenna modules, and to modify communication parameters for the wireless communication modules and the antenna modules based upon the operational information obtained from the database.

13. The wireless communication system of claim 12, wherein the plurality of antenna modules are fewer in number than the plurality of communication modules.

14. The wireless communication system of claim 12, wherein the database comprises a memory device configured to store the operational information.

15. The wireless communication system of claim 13, wherein the memory device comprises a programmable memory device.

16. The wireless communication system of claim 12, wherein the operational information comprises regional regulatory requirements related to one or more of the communication protocols.

17. A method for configuring wireless communications for an information handling systems, comprising:
- providing a database within an information handling system configured to store operational information associated with a plurality of wireless communication modules and a plurality of antenna modules within an information handling system, each wireless communications module being configured to process a different communication protocol, and each antenna module being configured to transmit and/or receive radio frequency signals associated with one or more of the communication protocols, the operational information being stored using identification numbers associated with the wireless communication modules and the antenna modules;
- selecting one of the plurality of wireless communication modules;
- selecting one of the plurality of antenna modules;
- utilizing the identification numbers to obtain from the database operational information for the selected wireless communication module and the selected antenna module;
- configuring communication parameters for the selected wireless communication module and the selected antenna module based upon the operational information obtained from the database; and
- communicating with an external device using the configured wireless communication module and the configured antenna module.

18. The method of claim 17, further comprising updating the operational information stored within the database through an external interface for the information handling system.

19. The method of claim 18, further comprising initiating the updating steps from the information handling system.

20. The method of claim 18, further comprising initiating the updating step from a source external to the information handling system.

* * * * *